May 3, 1960  G. W. JACKSON ET AL  2,935,023
STEERING AND AIR COMPRESSOR LUBRICATION SYSTEM
Filed Sept. 23, 1957  5 Sheets-Sheet 1
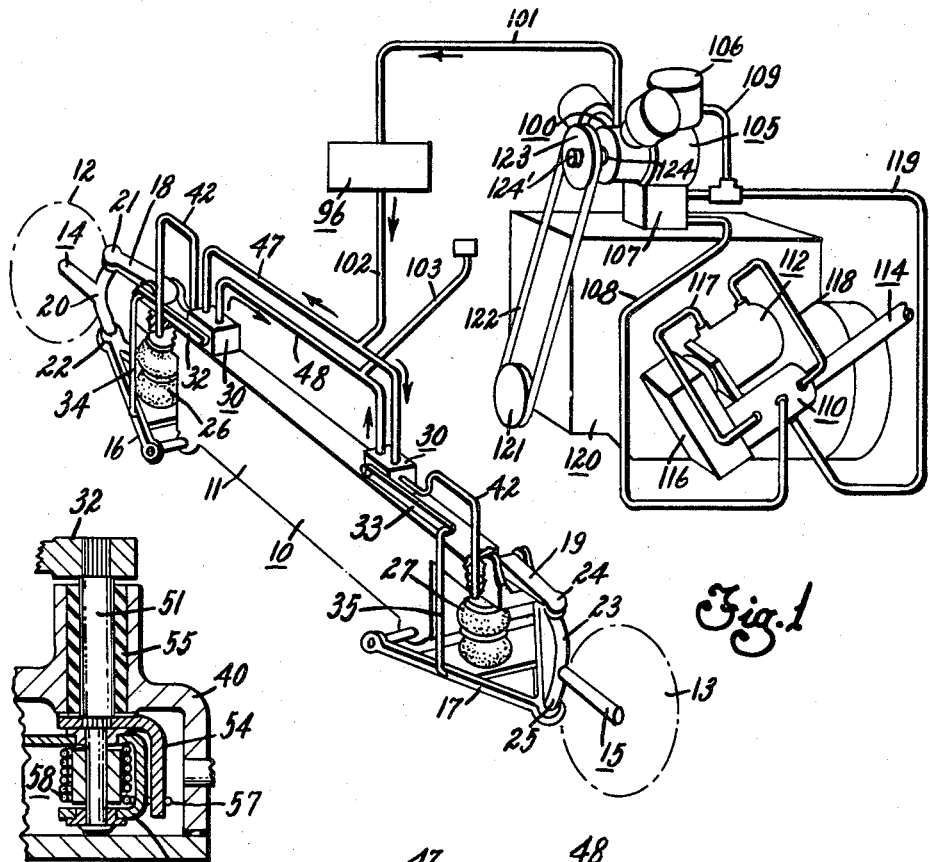
Fig. 1
Fig. 3
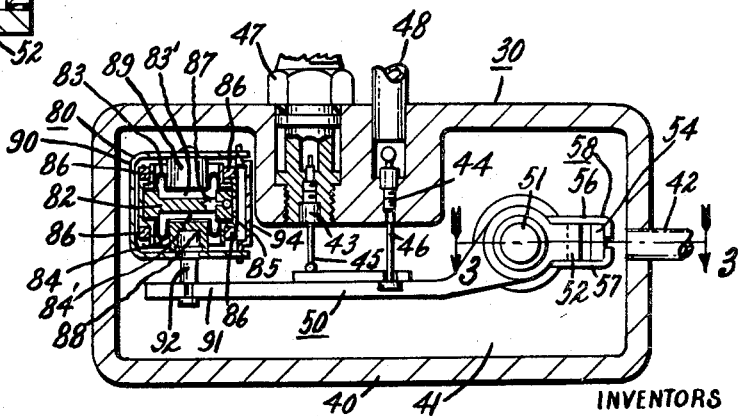
Fig. 2
INVENTORS
GEORGE W. JACKSON
FRANK E. LAFLAME
JOHN F. PRIBONIC
BY C. C. Staley
THEIR ATTORNEY

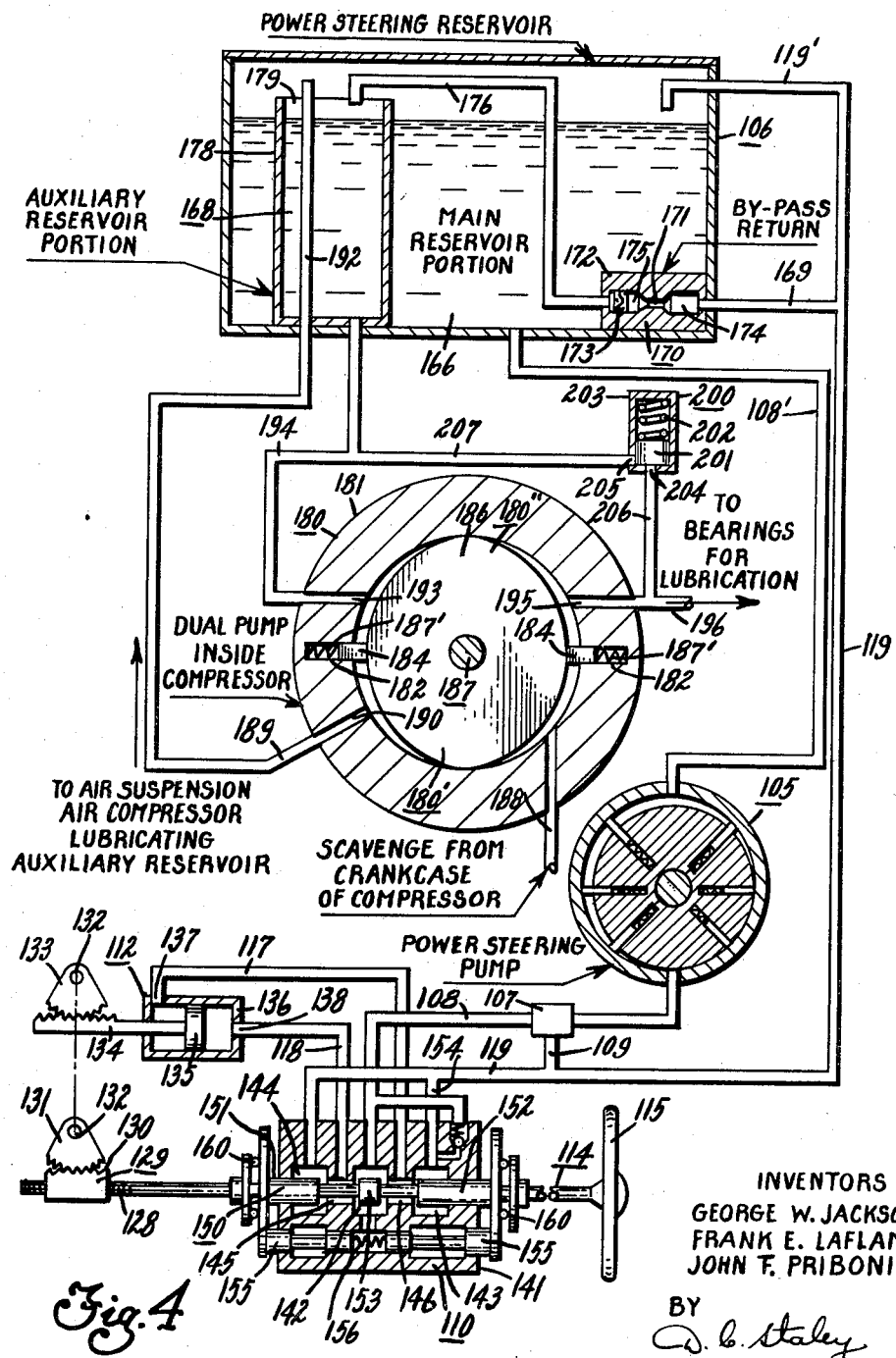

May 3, 1960 G. W. JACKSON ET AL 2,935,023
STEERING AND AIR COMPRESSOR LUBRICATION SYSTEM
Filed Sept. 23, 1957 5 Sheets-Sheet 3

INVENTORS
GEORGE W. JACKSON
FRANK E. LAFLAME
JOHN F. PRIBONIC
BY C. B. Staley
THEIR ATTORNEY

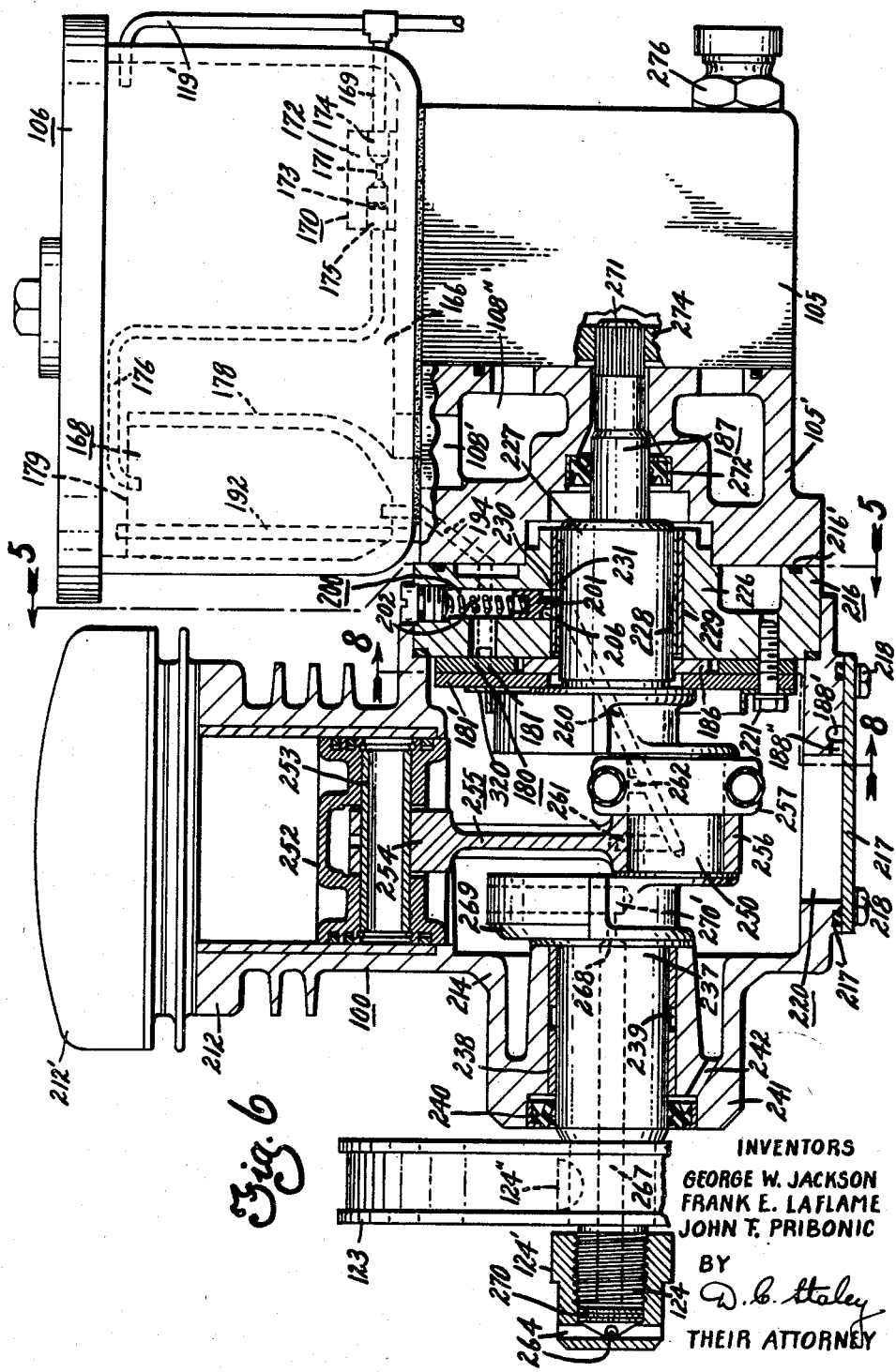

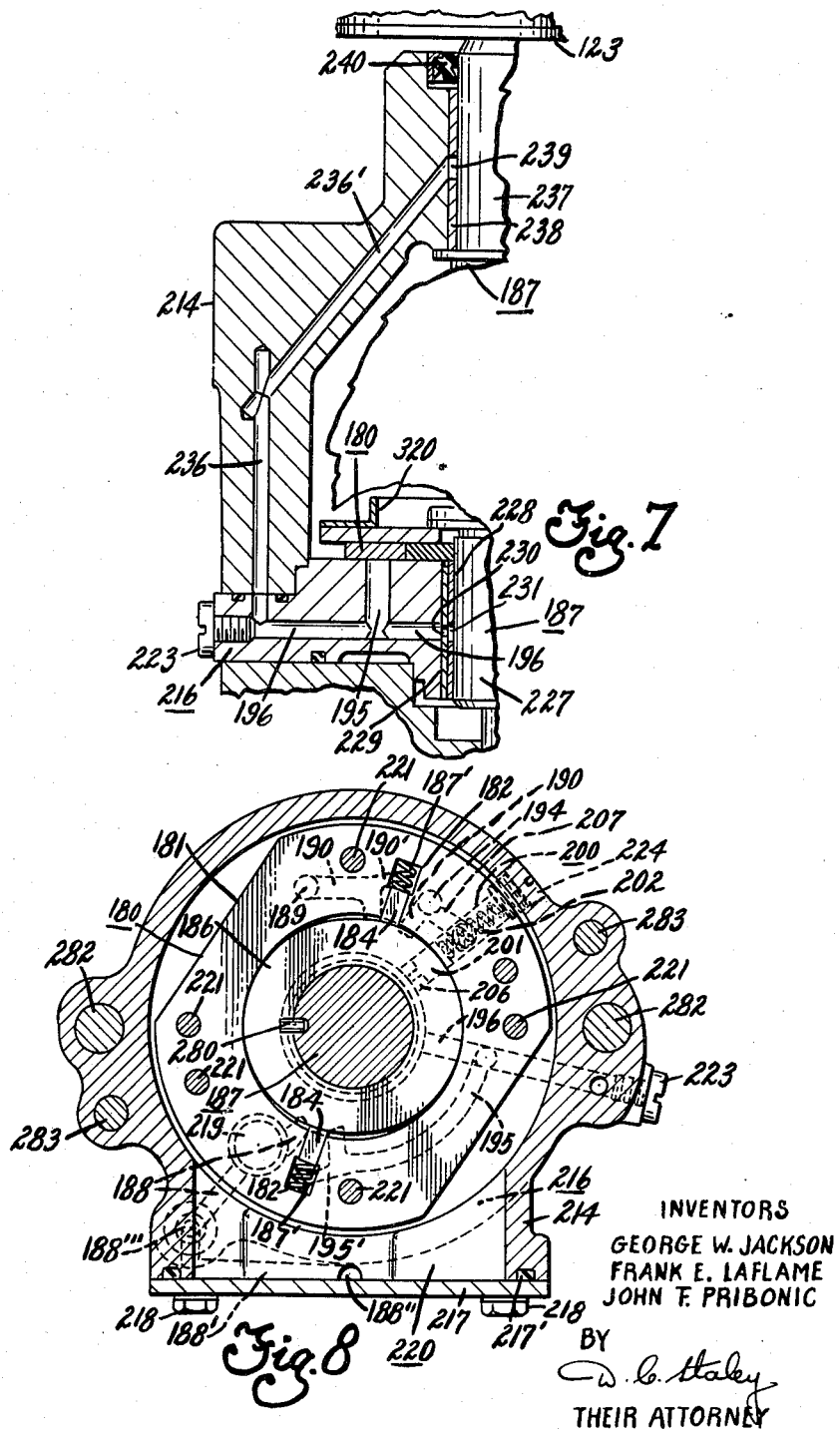

![](United States Patent Office)

2,935,023
Patented May 3, 1960

2,935,023

STEERING AND AIR COMPRESSOR LUBRICATION SYSTEM

George W. Jackson, Frank E. La Flame, and John F. Pribonic, Dayton, Ohio, assignors to General Motors Corporation, Detroit, Mich., a corporation of Delaware Application September 23, 1957, Serial No. 685,535

11 Claims. (Cl. 103—4)

This invention relates to motor vehicles, and particularly to vehicles equipped with both power steering means and a pneumatic suspension means operable to maintain a predetermined clearance height between sprung and unsprung masses of a vehicle.

An object of this invention is to provide an air compressor having a crankshaft-driven dual pump including a pressure lubrication portion and a compressor crankcase scavenging pump portion assembled adjacent to a crankshaft-driven power steering pump on which is mounted a wet reservoir including a main power steering portion and an auxiliary portion both containing a power steering fluid medium used also as lubrication for the air compressor.

Another object of this invention is to provide pump means for a vehicle suspension air compressor served by a lubrication system including a compressor dual pump having a lubrication pressure portion and a compressor crankcase scavenging portion formed between a cover and a compressor-crankshaft-journalling end member by a pump stator plate encircling an egg-shaped rotor driven by the crankshaft.

Another object of this invention is to provide a pump assembly for a combined vehicle power steering and air compressor lubrication system including a compressor dual pump having a lubrication pressure portion and a compressor crankcase scavenging portion formed between an annular cover and a compressor-crankshaft-journalling end member by a pump stator plate encircling an egg-shaped rotor driven by the crankshaft, the end member being located adjacent to a crankshaft-driven power steering pump on which a wet reservoir means is mounted including a main reservoir portion for the vehicle power steering and an auxiliary reservoir portion for compressor lubrication each containing a power steering fluid medium used for lubrication of the air compressor separate from the power steering.

Another object of this invention is to provide a pump and reservoir assembly for a combined vehicle power steering means and air compressor lubrication system in which a dual pump having a lubrication pressure portion and a compressor crankcase scavenging portion is provided to be driven by a compressor crankshaft which also drives a power steering pump serving in part for supply of a fluid medium to the power steering means from a main portion of a power steering reservoir mounted on top of the power steering pump and in part for supply of the same fluid medium to an auxiliary portion of the power steering reservoir utilized as a source of lubrication of the air compressor.

Another object of this invention is to provide a pump and reservoir assembly for a combined vehicle power steering means and air compressor lubrication system including an air compressor with a crankshaft journalled at one end in a bearing member forming one side of a dual pump having a portion for scavenging a compressor crankcase and another portion for supplying fluid medium under pressure for lubrication of the compressor from a source which is a power steering reservoir adapted with a restrictive by-pass return passage to permit return of fluid medium by a power steering pump to a main portion of the reservoir as well as to an auxiliary portion of the reservoir through the restrictive passage, the auxiliary portion of the reservoir serving exclusively as a source of lubrication for the compressor.

A further object of this invention is to provide a new pump, reservoir, and air compressor assembly having minimum structural parts for a combined vehicle power steering means and air compressor lubrication system utilizing only a power steering medium for both the power steering means and compressor lubrication.

Another object of this invention is to provide a dual pump for use in an air compressor and formed by an end bearing member for journalling a compressor crankshaft, by an annular stator portion having suitably biased vanes cooperating with a non-circular rotor rotated through rotation of a compressor crankshaft, and by a cover plate complementary to the end bearing member, the end bearing member providing passage forming means including therein a blow-off valve for relief of excessive fluid medium pressure from a pressure lubrication portion of the dual pump and also including an inlet to a scavenge portion of the dual pump from a crankcase portion of the air compressor.

Further objects and advantages will be apparent from the drawings, reference being had to the accompanying drawings wherein a preferred form of the invention is clearly shown.

In the drawings:

Figure 1 is a fragmentary diagrammatic representation of power steering means and a pneumatic suspension means combined in a system in accordance with the present invention.

Figure 2 is a cross-sectional elevational view of a control valve provided between sprung and unsprung masses of a vehicle in the system of Figure 1.

Figure 3 is a partial cross-sectional view taken along line 3—3 of Figure 2.

Figure 4 is a schematic diagram of the combined system for vehicle power steering and air suspension compressor lubrication of the present invention.

Figure 6 is a longitudinal cross-sectional view taken along 6—6 of Figure 5 and also showing a power steering pump and power steering reservoir having main and auxiliary reservoir structure for use in accordance with the present invention.

Figure 7 is a fragmentary cross-sectional view taken along line 7—7 of Figure 5.

Figure 8 is a cross-sectional view of a dual pump in the compressor taken along line 8—8 of Figure 6.

Figure 5:
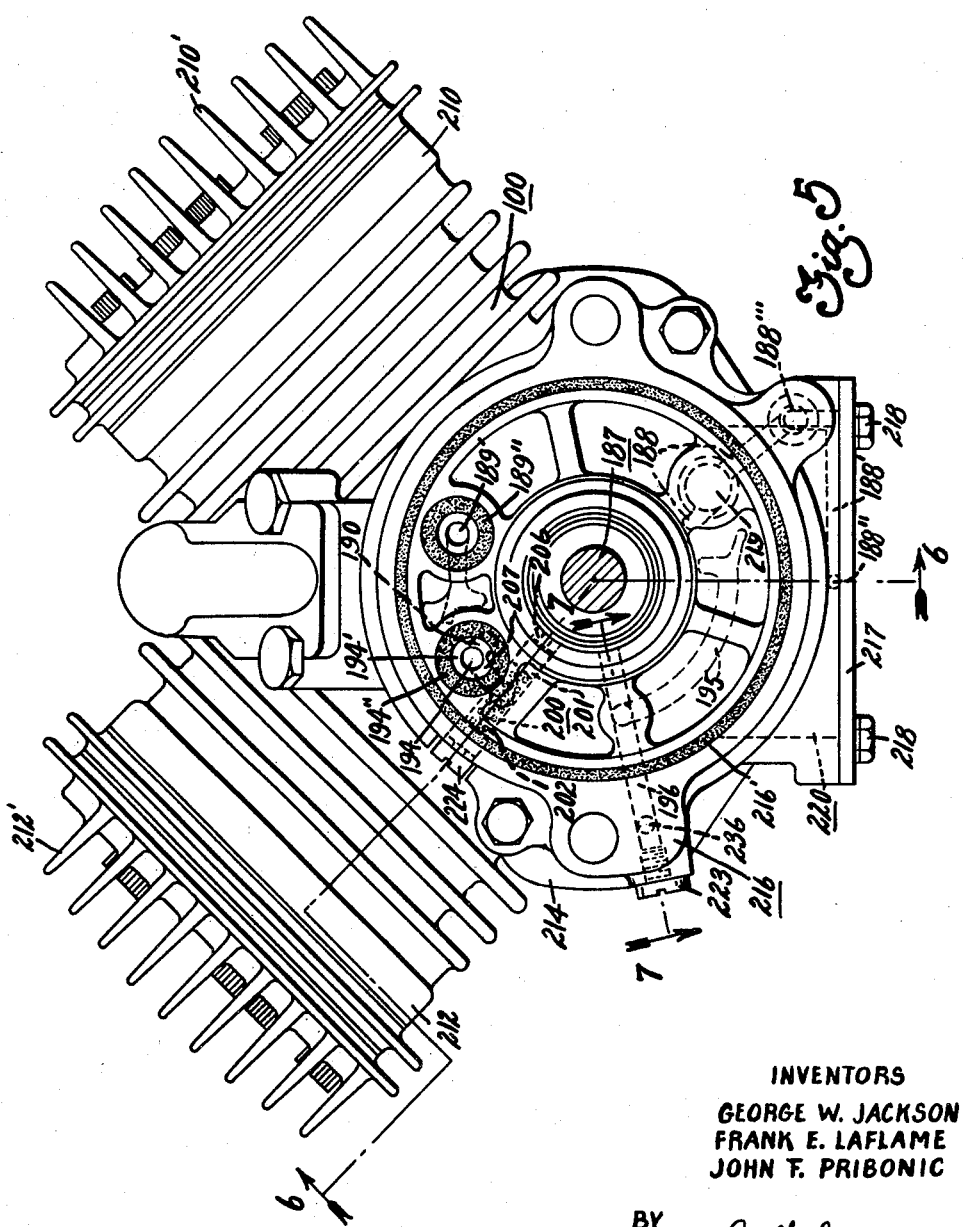
Figure 5 is an end elevational view of a compressor represented in the diagram of Figure 1 for use in the system of Figure 4.

In Figure 1 there is illustrated schematically a vehicle incorporating system and apparatus for establishing and maintaining a predetermined clearance height between a sprung mass, or body and an unsprung mass, or axle of a motor vehicle. The vehicle includes a chassis frame 10 on which a conventional body is placed. A front cross frame member 11 is shown and it is to be understood that longitudinal frame members not shown can be provided in a conventional manner extending to a rear frame portion relative to which a rear axle is carried in a conventional manner. Wheels 12 and 13 are journaled for rotation relative to front wheel axle assemblies 14 and 15 respectively as provided at each end of the front cross member 11. Each front wheel axle assembly consists of lower control arms 16 and 17 and upper control arms 18 and 19 respectively, pivotally carried on the cross frame 11. The control arms 16 and 18 are interconnected by a steering knuckle 20 connected with the control arms by spherical joints 21 and 22. Similarly, the control arms 17 and 19 are interconnected by a steering knuckle 23 that connects with the control arms by spherical joints 24 and 25. Fluid springs 26 and 27 are provided between the lower control arms 16 and 17 and opposite ends of the cross frame 11 whereby the chassis frame 10 is the sprung mass supported from the wheel assemblies 14 and 15 by means of the fluid springs 26 and 27. Preferably, the fluid springs 26 and 27 are of the bellows type adapted to receive air under pressure to effect resilient suspension of the chassis frame 10 upon the wheel assemblies, and to maintain a predetermined clearance height between the chassis frame and the wheel assemblies when the vehicle is in a static position, and to provide for correction of any change in height relation to reestablish the predetermined clearance height.

Fluid pressure within the springs 26 and 27 is regulated by fluid control valves generally indicated by numeral 30 that are supported on the chassis frame 10. The control valves 30 have actuating arms 32 and 33 respectively that are connected with the lower control arms 16 and 17 of the front wheel assemblies through actuating links 34 and 35. Thus when the chassis frame 10 settles downwardly relative to the front wheel assemblies, the actuating levers 32 and 33 are moved upwardly to open a fluid control valve within the valves 30 to allow fluid under pressure to be admitted into the air springs 26 and 27. Conversely, upward movement of the chassis frame 10 relative to the front wheel assemblies causes a downward movement of the control arms 32 and 33 to open fluid exhaust valves within the controls 30 to permit exhaust of fluid from the air springs. The foregoing action of the control valves 30 effects a correction of clearance height between the sprung mass and the unsprung mass of a vehicle to maintain clearance height relatively constant irrespective of load conditions. One of the control valves 30 is more particularly illustrated in Figures 2 and 3.

The control valve comprises a housing 40 having a chamber 41 from which a fluid supply conduit 42 extends into connection with one of the air springs 26 or 27 from the respective control valve. The housing 40 contains a fluid pressure inlet valve 43 and a fluid pressure outlet valve 44 each of which is similar to a conventional tire valve. The valve 43 is opened upon upward movement of an actuating stem 45 and the valve 44 is opened upon downward movement of the actuating stem 46. The fluid pressure inlet connection 47 carries the valve 43 and the valve 44 exhausts fluid into the conduit connection 48. The valve stems 45 and 46 are actuated by a lever or arm 50 that is supported on a shaft 51 for free rotation thereon. The arm 50 has a portion 52 engaged on opposite sides by opposite ends 56 and 57 of a torsion spring 58. Torsion spring 58 is visible in a cross sectional view of Figure 3. In addition to engaging opposite sides of portion 52, the opposite ends 56 and 57 of the torsion spring also engage an actuating member 54 that is attached to the shaft 51 that extends exteriorly of the housing 40 through a rubber bearing and seal member 55 as shown in Figure 3. The outer end of the shaft 51 carries the actuating arm 32 or 33 of the control valve 30.

When the actuating lever 32 moves upwardly causing clockwise rotation of shaft 51 as viewed in Figure 2, the arm 50 opens the valve 43 to allow fluid pressure to enter the chamber 41 to be delivered through a conduit 42 into the air spring connected with the valve.

When the lever 32 moves downwardly causing counterclockwise rotation of shaft 51 as viewed in Figure 2, the valve 44 is opened to allow exhaust of fluid from the air spring. The shaft 51 can oscillate relative to the actuating arm 50 and torsion spring ends 56 and 57 counteract excessive pendulum action without effecting comparable following movement of the arm 50 since the arm 50 is damped in its pivotal movement about shaft 51 by a dash pot or damping device generally indicated by numeral 80.

The damping device 80 comprises a partition member 82 having diaphragms 83 and 84 secured to opposite sides thereof by annular clamping sleeve means 85 which are fixedly supported relative to the housing 40 by means of laterally extending arms 86. The diaphragms 83 and 84 together with the partition member 82 form opposite cavities 83' and 84' communicating with each other through a restrictive passage 87 in the partition member 82 as shown in Figure 2. These cavities are preferably filled with a damping fluid having a relatively constant viscosity over a wide range of temperature variation. The damping action results when annular abutment members 88 and 89 carried by a C-shaped spring member 90 are moved in one direction or the other by the action of the end 91 of arm 50 transmitted through the C-shaped spring 90 by a connecting stud 92. Use of the spring means 90 assures that the members 88 and 89 are always resiliently urged against the diaphragms 83 and 84 to eliminate the formation of air pockets in the cavities or chambers 83' and 84'. The resilient urging of the spring means 90 assures engagement of the diaphragms 83 and 84 with the damping fluid in the chambers 83' and 84' even when the damping fluid contracts in response to a decrease in temperature for example. To prevent complete collapse of the members 88 and 89 relative to the damping chambers, a spacing bracket 94 is provided assuring a predetermined minimum spacing between the free ends of the spring means 90 as shown in Figure 2.

The control valves 30, one of which has just been described in detail with Figures 2 and 3, obtain fluid under pressure from an air reservoir generally indicated by numeral 96 on Figure 1. Fluid under pressure, preferably air, is supplied to the air reservoir 96 by means of a compressor generally indicated by numeral 100 having a conventional air intake and delivering air under pressure through a conduit 101 to the air reservoir or high pressure storage tank 96 for delivering to the control valves 30 through a conduit 102 to the connection 47 with the control valves 30. Control valves 30 have their exhaust conduits 48 connected with an exhaust line 103 as shown in Figure 1. The air suspension means described functions such that the damping device 80 of each control valve 30 retards the opening and closing of the inlet and exhaust valves 43 and 44 so that rapid axle oscillations will not cause instantaneous delivery and exhaust of fluid to and from the air springs that establish a predetermined clearance height between the sprung and unsprung masses. Air is supplied or exhausted from the respective air springs 26 and 27 only in response to average change in the predetermined clearance height to other than the predetermined clearance height between the sprung and unsprung masses resulting from either an increase or decrease of loading of the body of the vehicle which is then compensated to reestablish the predetermined clearance height by increase or exhaust of air under pressure in the air springs 26 and 27.

As indicated in Figure 1, the motor vehicle also is provided with fluid actuated, in this instance hydraulically actuated components, specifically illustrated as a hydraulically actuated power steering means. The power steering means includes power steering pump generally indicated by numeral 105 that receives fluid from a power steering reservoir 106 and delivers fluid under pressure into a flow control and by-pass valve 107. The flow control and by-pass valve 107 is adapted to maintain a predetermined minimum pump pressure in a discharge line 108 for continuous supply of a power steering fluid medium to the hydraulically actuated power steering component to insure supply of fluid to the component at all times when the vehicle is operating. This flow control and bypass valve 107 is also connected to the reservoir 106 by means of a line 109 so that fluid in excess of that required to maintain the predetermined minimum pressure in the fluid line 108 will be bypassed to the reservoir 106. The controlled pressure line 108 connects directly with a power steering control valve 110 that regulates the flow of hydraulic fluid medium to a fluid actuated component generally indicated by numeral 112.

Figure 1 also shows a broken-off view of a steering column generally indicated by numeral 114 as well as gearing means 116 actuated both by the rotation of the steering wheel connected in a conventional manner with the steering column 114 and by the fluid actuated component 112 as is more fully explained with Figure 4. Conduits 117 and 118 connect opposite ends of the control valve 110 with opposite ends of the fluid actuated component 112. A return conduit 119 from the control valve 110 is shown connecting opposite sides of the control valve 110 and leads to the power steering reservoir 106. Line 109 is tied into this return conduit 119 for return of fluid to the power steering reservoir 106.

Also shown in Figure 1 is a motor generally indicated by numeral 120 of the vehicle having a conventional crankshaft (not shown) which drives a pulley 121 and belt 122 that engages a pulley 123 attached to a crankshaft extension 124 of the air compressor 100. Thus the vehicle engine 120 by means of a suitable belt and pulley drive causes rotation of a compressor crankshaft through pulley 123 effecting compression of air supplied through conduit 101 to the high pressure air storage tank 96 referred to in connection with Figure 1. Another extension of the compressor crankshaft serves to effect operation of the power steering pump 105 due to the coaxial relationship of the power steering pump 105 relative to the compressor 100 adjacent one side of the twin cylinder compressor illustrated in Figure 1. It is apparent that the power steering reservoir 106 is mounted on top of the power steering pump 105 as shown in Figure 1. It is one of the purposes of this invention to use a power steering means reservoir as a lubricating source for another device, in this instance the air compressor 100.

Figure 4 is a schematic diagram of a combined system for vehicle power steering means and air suspension compressor lubrication in accordance with the present invention. The components and functioning of the air suspension means have been described in connection with Figures 1, 2, and 3 and a brief summary of the components and functioning of the power steering means is as follows with reference to Figure 4.

The steering unit comprises the steering column 114 having the usual steering wheel 115. The steering column 114 includes a screw 128 that carries a nut 129 having a rack 130 engaging a rack segment 131 carried on a shaft 132 that is connected with a pitman shaft for actuating the front wheels of a motor vehicle. The shaft 132 connected with the pitman shaft is also connected with a rack segment 133 that engages a rack 134 actuated by the hydraulic component 112. The rack 134 is connected with a piston 135 reciprocable within a cylinder 136 adapted to be supplied with fluid through either of the ports 137 or 138 through the lines 117 or 118, respectively, or exhaust fluid through these lines alternately so that reciprocation of piston 135 in the cylinder 136 can transmit driving power to the rack segment 133 thereby power actuating the rack segment 131 and the pitman shaft for steering the front wheels.

The control valve 110 for regulating supply of fluid medium under pressure or exhausting power steering fluid medium from the hydraulically actuated component 112 comprises a body 141 having three chambers 142, 143, and 144 interconnected by passages 145 and 146. The pressure supply line 108 from the power steering pump source 105 connects with the chamber 142 and the two end chambers 143 and 144 connect with the return line 119 that connects with the power steering reservoir 106. The two supply lines 117 and 118 for the hydraulically actuated component 112 connect with the passage 145 and 146 as shown.

A spool valve 150 having two end portions 151 and 152 and a middle portion 153 is adapted for axial reciprocation in the body 141 to direct flow of fluid between the passages 117 and 118 or to allow the fluid to circulate through the return lines 154 and 119 to the reservoir 106. The body 141 of the control valve 110 is provided with self-centering plungers 155 and a spring 156 which normally position the spool 150 in the position illustrated in Figure 4. Normally, when steering actuation is not required, fluid medium under pressure circulates from the pump source through the line 108 into the chamber 142 and then through the passages 145 and 146 into the return lines 154 and 119 to the reservoir 106. When steering actuation is to be obtained, and the steering wheel is turned in one direction or another, the reaction of the screw 128 and the nut 129 is such as to cause one or the other of the thrust bearings 160 to move the spool 150 axially in one direction or the other, depending upon the direction of the rotation of the steering wheel 47 whereby the center spool member 150 is moved to close either passage 145 or 146. For example, if the reaction is such as to cause the spool 150 to move in a right-hand direction, the passage 146 will be closed whereby fluid under pressure entering chamber 142 is directed through the line 118 to the right-hand end of the power unit 112, exhaust of fluid being effected from the left-hand end of the power unit through the line 117 into the passage 146 and into the chamber 143 for return to the reservoir 106 through the return lines 154 and 119. Reverse actuation of the steering wheels will cause reverse actuation of the spool 150 to effect discharge of fluid medium under pressure through the line 117 into the power unit 112 and exhaust of fluid through the lines 118 back to the reservoir 106.

As shown in Figure 4, in the combined system of the present invention, the power steering means is capable of functioning independently using power steering fluid medium from the power steering reservoir 106. A conduit 108' is connected between the power steering pump 105 and the bottom of a main portion 166 of the power steering reservoir 106.

In accordance with the present invention, the power steering reservoir 106 is also provided with an auxiliary reservoir portion generally indicated by numeral 168 in addition to the main reservoir portion 166. The fluid medium return line 119 has an end portion 119' extending into the power steering reservoir 106 for return of power steering fluid medium to the main reservoir portion 166 in a usual manner. However, an additional line 169 is connected to the return line 119 at one end and to a by-pass return means generally indicated by numeral 170 provided inside the power steering reservoir 106 as shown in Figure 4. This by-pass return means preferably comprises restrictive passage 171 formed by a body 172 in which there is also located a screen 173 for filtering out any foreign materials which may be present in the power steering fluid medium. The body 172 is provided with chambers 174 and 175 interconnected by the restrictive passage 171 and power steering fluid medium in a limited quantity is by-passed from the return line 119 through line 169, chamber 174, restrictive passage 171 through screen 173 in chamber 175 to a conduit 176 terminating over the top of the auxiliary portion 168 in the power steering reservoir 106. Fluid dumped by conduit 176 into the auxiliary reservoir 168 will fill the auxiliary reservoir with power steering fluid medium to be used as a source of lubrication for bearings in the compressor 100 illustrated in Figure 1. The auxiliary reservoir portion 168 is adapted to contain a quantity of power steering fluid medium adequate for lubrication of the bearings in the air compressor or other device being lubricated through use of a pressure lubrication pump means disposed inside the air compressor and driven by the air compressor crankshaft as the latter is rotated through the belt and pulley arrangement described above.

The auxiliary reservoir portion 168 includes a cylindrical container 178 having an open top 179 as shown in the schematic diagram of Figure 4. The container 178 may be formed integral with the power steering reservoir 106 if desired. In any event, power steering fluid medium filled into the auxiliary reservoir portion 168 can overflow into the main reservoir portion 166 whenever the container 178 is filled.

It is to be understood that the twin cylinder air compressor illustrated in Figure 1 has a piston reciprocable in each cylinder in a usual manner to compress air for storage in the high pressure air storage tank 96. Each of the pistons in the air compressor is fitted through a pin to a conventional connecting rod which is attached to an eccentric portion of a crankshaft of the compressor in a manner familiar to those skilled in the art. The crankshaft of the compressor is rotatably supported in a crankcase housing of the compressor by crankshaft journalling portions providing bearing support for opposite ends of the crankshaft. Provided inside the compressor crankcase housing is a dual pump which is operatively driven by rotation of the compressor crankshaft. This dual pump is illustrated in the diagram of Figure 4 and is generally indicated by the numeral 180. The dual pump includes a stator portion 181 having recesses 182 of proper size and depth to receive vanes 184 biased into engagement with an eccentric pump rotor 186 by springs 187' provided in the recesses 182. The vanes and eccentric or egg-shaped rotor are maintained in pumping cooperation relative to the oil pump startor during the rotation of the rotor 186 by compressor crankshaft 187 to which the rotor 186 is suitably attached. The periphery of the pump rotor 186 cooperates with each vane 184 for reciprocable movement of the vanes relative to the recesses in the pump stator in a conventional manner.

The dual pump 180 includes a scavenging pump portion generally indicated by numeral 180' and a lubricating pump pressure portion generally indicated by numeral 180" on opposite sides of a diameter of the dual pump which may be drawn through the vanes 184. An inlet 188 is provided for the scavenging pump portion 180' for removal of power steering fluid medium used as lubricating oil in the compressor. The scavenging pump portion 180' removes this fluid medium from the compressor crankcase housing by way of the inlet 188 and a filter or screen can be provided in a passage connected between the crankcase housing and the inlet 188 for preventing entry of foreign material into the dual pump after the power steering fluid medium has performed the lubricating function in accordance with the present invention in the compressor. The scavenging pump portion 180' forces the power steering fluid medium to a conduit 189 connected to a scavenge pump outlet 190 forcing the fluid medium upwardly through the auxiliary reservoir portion 168 by way of a stand pipe 192. As described earlier, the auxiliary reservoir portion 168 is located in the power steering fluid reservoir 106 as shown in the diagram of Figure 4.

The pressure pump portion 180" of the dual pump 180 includes an inlet 193 connected to a line 194 communicating with the bottom of the auxiliary reservoir portion 168 for supply of power steering fluid medium to be utilized in lubrication of the compressor 100. The inlet 193 channels lubricating fluid to the pressure pump portion 180" of the dual pump 180 which forces fluid under pressure outwardly through an outlet 195 into a conduit 196 connecting with passages leading to the bearings of the compressor being lubricated with the power steering fluid medium. Lubricating fluid medium is forced under pressure to bearing surfaces between connecting rods and eccentric crankshaft portions as well as to crankshaft journalling portions provided inside the compressor 100.

To assure that lubricating pressure does not exceed a predetermined maximum value, a blow-off or blow-by means generally indicated by numeral 200 is provided in the system of the present invention. This blow-off includes a valve spool 201 biased by a spring 202 in a housing 203 to a position shown in Figure 4 whereby the spool closes off communication between ports 204 and 205 of the housing so long as the fluid pressure does not exceed the force of spring 202. A conduit 206 is connected between the pressure lubrication line 196 and port 204 thereby exposing the spool 201 to the output pressure from the pressure lubrication portion 180" of the dual pump 180. When excess fluid pressure causes displacement of the spool 201, the power steering fluid medium is permitted to blow off through the conduit 168 and ports 204 and 205 to a line 207 connected with the supply line 194. The purpose for return of the blow-by fluid medium to the inlet passage 194 and inlet 193 of the pressure lubrication portion of the dual pump rather than to the reservoir directly lies in the functioning of the dual pump 180. Both pump portions 180' and 180" have an equal displacement as far as lubricating oil under pressure and scavenging are concerned due to the symmetrical structure of the rotor 186. The capacity of the scavenging portion 180' of the dual pump 180 is such that a so-called "dry" crankcase is maintained in the compressor 100 leaving only a minimum amount of oil in the compressor during operation. It is necessary that the scavenging phase of the operation of the dual pump be kept slightly ahead of the pressure lubricating phase and with blow-by fluid medium being channeled by conduit 207 into inlet conduit 194, the flow from the auxiliary reservoir portion 168 becomes additive to the flow of oil or power steering fluid medium from conduit 206 while the passage 194 below the juncture with conduit 206 in Figure 4 remains the same size as when no blow-by is effected due to excess pressure. Since the lower portion of the conduit or passage 194 below the juncture with the conduit 206 remains at its original size, and since there is an additive flow from the blow-off and from the auxiliary portion 168 of the power steering reservoir 106, there is a restriction or hindrance to flow from the reservoir to the pressure lubricating pump portion 180' while the scavenging pump continues to operate returning oil to the auxiliary reservoir portion 168 through stand-pipe 192 at an unrestricted rate.

The advantage of having the auxiliary reservoir 168 with the power steering reservoir 106 lies in a safety feature whereby fluid medium is available for lubrication of the compressor in the present combined system even when a leak or complete loss of fluid occurs in the power steering means using the main reservoir portion 166. Yet it is possible to utilize the power steering fluid for lubrication of the compressor without necessitating the additional cost of providing both a power steering reservoir as well as a main reservoir including the auxiliary reservoir. It is apparent that the auxiliary reservoir contains appreciably less fluid than the main reservoir portion of the power steering reservoir. Since the auxiliary reservoir contains less fluid than the main reservoir portion, a further advantage is realized in that only the smaller amount of fluid contained in the auxiliary reservoir portion can ever be drained through conduit 194 and pressure lubrication pump portion to conduit 196 to the bearings of the compressor in the event that the vehicle equipped with the system of the present invention stands idle for a long period of time. Since only the smaller quantity of fluid can drain down during long periods of idleness, no flooding of the dual pump or crankcase can occur in the compressor 100. At most, during inoperativeness of the compressor, the fluid content of the auxiliary reservoir portion 168 can flow to the crankcase housing. This assures adequate priming of the lubricating system with the compressor during compressor starting. Any fluid which has drained down to the crankcase housing of the compressor is pumped through the scavenging pump portion 180' of the dual pump 180 to the auxiliary reservoir portion 168 as described above and continues to circulate for lubricating purposes of the compressor even if the power steering system should lose all power steering fluid therein. The by-pass return 170 assures that the auxiliary reservoir portion 168 is filled to its proper level during operation of the power steering pump. This guarantees continued supply of lubricating oil or power steering fluid medium for the lubrication of the compressor. Thus, essentially, there are three pumps cooperating in the system of the present invention for assuring continued supply of adequate fluid medium for lubricating purposes of the compressor or other device receiving fluid under pressure from the pressure lubrication pump portion of the dual pump. These three pumps are the scavenging pump, the power steering pump, and the pressure lubrication pump.

The passages and conduits described with the system of Figure 4 interconnecting the three pumps with the power steering reservoir 106 having main and auxiliary portions serve to channel a fluid medium from a wet reservoir common to the power steering means and air suspension air compressor lubrication means. Since a substantially dry crankcase is maintained by the scavenging pump portion 180' of the dual pump, the compressor crankshaft can be provided with a ventilating passage terminating in a cap 124' shown at the end 124 of the compressor crankshaft in the view of Figure 1. This cap 124' is apertured to permit breathing or inter-change of air to inside the compressor crankcase to compensate for the removal of power steering fluid medium used for lubrication and scavenged from the bottom of the compressor crankcase by the system described above.

The specific structural arrangement of the compressor 100 with the power steering pump 105 and the reservoir 106 of Figure 1 is shown in detail in Figures 5, 6, 7, and 8. Figure 5 is an end elevational view of the air compressor 100 which includes twin cylinders indicated by numerals 210 and 212 in Figure 5. Each of these cylinders is provided with a finned head portion 210' and 212' respectively. The cylinders are formed extending from a housing 214 of the air compressor in a V-shaped configuration. Each of the cylinders is provided with an air intake passage not visible in the drawings but conventional with air compressors. A cross section of the compressor crankshaft 187 is visible in Figure 5 which shows the end elevational view of the compressor as taken along line 5—5 of Figure 6. The view of Figure 5 shows the compressor housing 214 behind a crankshaft journalling end member generally indicated by numeral 216. This end member 216 is provided with an opening 194" surrounded by a gasket 194" to maintain sealed relationship between the end member and a power steering pump housing 105' to complete the conduit 194 referred to in the description in Figure 4 and shown as a dotted line or phantom representation in Figure 6. Figure 5 further shows an opening 189' surrounded by a gasket 189" corresponding to the connection of the end member with the power steering pump in forming the conduit 189 referred to with Figure 4. An O-ring seal or annular gasket 216' is shown in Figure 5 as well as Figure 6 for maintaining a sealed relationship between the end member 216 and pump housing 105' of Figure 6. The crankcase housing 214 is provided with a bottom cover plate 217 maintained in sealing engagement with a gasket 217' visible in Figures 6 and 8 by bolts 218 threaded into engagement with the housing 214 to hold the cover plate 217 in position in a usual manner. The cover plate 217 and housing 214 form a crankcase or sump space generally indicated by numeral 220 in the bottom of the air compressor 100. As described earlier, the scavenging pump portion 180' of the dual pump operates at a rate of fluid displacement sufficient to maintain a substantially "dry" crankcase in the air compressor. For purposes of scavenging the crankcase, a conduit extension 188' is visible in Figures 5, 6, and 8 together with an inlet 188" leading to the inlet passage 188 for the scavenge pump portion 180' described with Figure 4. In the passage 188 connected with the passage 188' as shown in Figure 5, a sealing juncture similar to those for openings 194' and 189' with gaskets is provided at 188''' between the compressor housing 214 and the end member 216. This juncture 188''' is indicated by dotted lines in the view of Figure 5. A space 219 can be provided in the passage 188 for receiving a screen or filter to remove foreign material from the power steering fluid medium scavenged from the compressor crankcase 220. The conduit 207 referred to in Figure 4 is also visible in the structure as shown by dotted lines in Figure 5. The conduit 207 extends laterally from the passage 194 behind the opening 194' to the blow-off means 200 shown including the spring 202 and spool 201. The spring 202 and spool 201 can be best seen in Figure 6 as they are disposed within the end member 216 in a housing equivalent to that labeled 203 in the schematic diagram in Figure 4. A passage 206 is visible in Figures 5, 6 and 8 connecting the blow-off means 200 with a space adjacent a bearing surface lubricated with the power steering fluid medium in accordance with the present invention. The space adjacent the bearing surface receives fluid medium under pressure through the conduit 196 referred to in the diagram of Figure 4 and visible in Figure 5 as well as in Figure 8 after fluid under pressure is forced by the pressure lubrication pump portion 180" of the dual pump through outlet 195. As shown in Figure 8, an outlet extension 195' is provided laterally of the outlet 195 of the pressure lubrication pump portion for supply of fluid medium under pressure to cavity 182 for biasing one of the vanes 184 into engagement with the peripheral surface of the eccentric rotor 186 of the dual pump to supplement the biasing force of the springs 187' provided for each of the vanes. Also visible in Figure 8 is a similar extension 190' communicating with the chamber 182 for also fluid biasing the vane of the opposite side of the dual pump supplemental to the force of spring 187'. The extension 190' extends laterally of the scavenge pump outlet 190 through which fluid medium under pressure is forced by the scavenge pump portion 180' of the dual pump. Providing the fluid biasing of the vanes 184 is an optional feature supplemental to the use of springs 187 for biasing the vanes 184. Figure 8 shows the conduit 189 leading from the scavenge pump portion output to the auxiliary reservoir portion 168 as described with the diagram of Figure 4.

The dual pump assembly provided inside the air compressor includes the end member 216, the stator plate 181 and a cover plate 181' visible in Figure 6. The parts 181, 181' and 216 together with an annular shield 320 are held in a sandwich-like assembly by bolts such as 221, one of which is shown in Figure 6. Thus the dual pump is formed as an assembly inside the air compressor housing with the end member 216 of this housing serving also as one side of the dual pump assembly. Most of the passages communicating with the dual pump at the inlet and outlet portions of the pressure lubrication and scavenging pump portions are formed by the end member 216. Passages drilled or bored into the end member 216 are closed off by cap members such as caps 223 and 224 for example for passage 196 and for the blow-off means 200, respectively. The end member 216 is also provided with a hub portion 226 shown in Figure 6 for journalling one end 227 of the crankshaft 187 of the air compressor 100. A suitable bushing 228 and sleeve 229 can be provided between the hub portion 226 of the end member and the journal portion 227 of the crankshaft 187. The sleeve 229 is provided with an opening or radial hole 230 which communicates with the pressure output passage 196 as shown in Figure 7, as well as with an annular groove or space 231 formed by the bushing 228 adjacent the journal portion 227 of the crankshaft. Thus power steering fluid medium is supplied under pressure from the pressure lubrication pump portion of the dual pump to the journal portion and bearing surfaces of one end of the crankshaft in the air compressor. Pressure of the fluid medium causes a spreading of the fluid medium between the bushing and journal portion of the crankshaft while the blow-off passage 206 is adjacent the opening 230 and annular space 231 as shown in the cross-sectional view of Figure 6. Due to the location of blow-off passage 206, the blow-off means 200 are capable of functioning to relieve excess fluid pressure as described with the system illustrated diagrammatically in Figure 4.

Figure 7 is a fragmentary cross-sectional view taken along line 7—7 of Figure 5 to illustrate passages formed by the end member 216 and compressor housing 214 for channeling power steering fluid medium under pressure to the crankshaft 187 at an opposite journal portion 237. The journal portion 237 is supported by a bushing 238 having a fluid passage 239 extending radially therethrough similar to the annular space 231 of bushing 228. The exact configuration of this radial opening 239 may be varied according to lubrication needs and may comprise a spiral or arcuately extending groove relative to the journal portion 237 of the crankshaft 187. Fluid is preferably supplied under pressure from the output passage 195 of the pressure lubrication portion of the dual pump through a passage 236 extending laterally of the passage 196 and longitudinally of the axis of rotation of the crankshaft 187 as shown in Figure 7. The passage 236 connects with an oblique passage extension 236' communicating with the space 239 formed by the bushing 238 adjacent the journal portion 237 of the crankshaft 187. As shown in Figure 6, an annular sealing means 240 is provided for preventing leakage of fluid medium from the compressor around journal portion 237 relative to the housing 214 adjacent a hub end portion 241. As also shown in Figure 6, this hub end portion 241 can be provided with a relief passage 242 to permit drainage of fluid medium used for lubrication of the journal portion 237 from space adjacent to the sealing means 240 down into the crankcase or sump 220 of the air compressor.

For lubrication of the crankshaft at other than journal portions 227 and 237 separate passages are provided extending into an eccentric portion 250 of the crankshaft 187. As mentioned earlier, each compressor cylinder is provided with piston means shown specifically in Figure 6 as a piston 252 attached by a pin 253 to one end 254 of a connecting rod 255 having a bearing portion 256 fitted around the eccentric portion 250 of the crankshaft in a usual manner. A similar piston and connecting rod attachment with the crankshaft is provided for each of the cylinders of compressor 100. In Figure 6 a bracket 257 for attachment to the journal portion of the other connecting rod or the other piston is visible. Lubricating fluid medium supplied to the bearing portion 227 and annular space 230 formed by bushing 228 can also flow into a diagonally drilled passage 260 of the crankshaft as shown in the cross-sectional view of Figure 6 by dotted lines. A pair of passages 261 and 262 are provided in the eccentric portion 250 of the crankshaft extending radially outwardly thereof for supply of lubricating fluid medium to bearing surfaces between the eccentric portion 250 and each of the ends of the connecting rods journalled around the eccentric portion 250. A separate passage extension can be provided longitudinally within the connecting rods extending to the bearing surfaces of the connecting rod relative to each pin 253 or a splashing action can be relied upon for lubrication of each pin 253 if the scavenging pump portion of the dual pump in providing a substantially "dry" crankcase still leaves sufficient fluid inside the crankcase 220 resulting in splashing of the power steering fluid medium for lubrication of the pins during rotation of the crankshaft 187 by the pulley and belt arrangement described with Figure 1.

Figure 6 also shows the pulley 123 referred to in the diagram of Figure 1. This pulley 123 is secured to an end of the crankshaft 187 by a Woodruff key 124" adjacent the ventilating end cap 124' referred to with the description of Figure 1. As shown in Figure 6, the end cap is provided with radial passages 264 which communicate with an axial passage 267 drilled longitudinally through the crankshaft 187 from one side and extending to a restrictive orifice 268 formed adjacent an eccentric lobe 269 on the crankshaft. A filter 270 may be provided for preventing entry of dust and other foreign material through the radial passages 264 into the passage 267 of the crankshaft in addition to the restrictive passage formed by the orifice 268. For permitting breathing or entry of air relative to the crankcase 220 inside the compressor housing 214, the lobe 269 is provided with a passage 270' extending radially of the axis of rotation of the crankshaft and communicating with the space inside the compressor housing 214 as well as with the orifice 268. The lobe 269 effects a splashing action relative to any fluid medium which may be in the crankcase 220 when the lobe 269 is positioned downwardly as viewed in Figure 6. During the time when the lobe 269 is positioned upwardly as shown in Figure 6, a breathing action can occur permitting air interchange through the passages 264, 267, orifice 268 and passage 270' between the atmosphere outside the compressor and space inside the compressor housing 214.

As seen also in Figure 6, the housing 105' of the power steering means pump 105 is attached to the end member 216 adjacent the air compressor with a pump driving portion 271 of the crankshaft 187 extending opposite the end of the crankshaft on which the cap 124' is threadedly attached. An annular sealing means 272 is provided as shown in Figure 6 between the housing 105' and the crankshaft 187. The portion 271 of the crankshaft 187 is attached to rotor means 274 of the power steering pump in a usual manner. A phantom representation of the power steering reservoir 106 is also shown in Figure 6. As described with the diagram of Figure 4, and the schematic illustration of Figure 1, the power steering reservoir 106 is located on top of the power steering pump 105. The phantom outline of Figure 6 illustrates the supply passage 108' between the main portion 166 of the power steering reservoir 106 and the power steering pump 105. An inlet cavity 108" formed by the housing 105' of the power steering pump is also outlined in Figure 6. A fitting 276 is shown with the power steering pump 105 in Figure 6 representing output of the power steering pump in accordance with the description relating the pressure relief means 107 and output conduit 108 described with the system of Figure 4. Use of the fitting 276 is optional since other fluid connecting means can be provided relative to the power steering pump 105. The by-pass return means 170 described with the system of Figure 4 are outlined together with the return conduits for dumping fluid medium in the power steering reservoir portions 166 and 168 as described with the system of Figure 4.

Figure 8 illustrates a key 280 interconnecting the dual pump rotor 186 and crankshaft 187 for establishing a driving connection therebetween. Also shown in the cross sectional view of Figure 8 are portions of assembly bolts 282 and guide lugs 283 for retaining the power steering housing 105' in assembled relationship with the end member 216 and compressor housing 214 in a usual manner.

It is apparent from the structural relationship outlined by Figure 6 that the auxiliary reservoir portion 168 is located above the crankcase 220 and that the scavenging pump portion of the dual pump serves to raise power steering fluid medium from the bottom of the crankcase 220 to the auxiliary reservoir portion 168 by means of the passage 189 described with the system of Figure 4. For purposes of clarity the passage 189 is not shown in Figure 6, but only the stand-pipe 192 is indicated in the phantom outline.

It is apparent that the passage or bore 264—267—268—270 arrangement forms a centrifuging-filtration means as well as a ventilating means through the crankshaft for the crankcase. The advantage of the passage 270' with the lobe or counterbalance weight 269 lies in the flinging action caused by the counterbalance to keep oil that remains in the crankcase during scavenging by the pump means from escaping through the ventilating passage and bore structure 264—267—268. Conversely, the cap 124' with radial passages 264 keeps dust and dirt from entering through bore 267 to clog passage 268 and 270' or to enter the compressor through the crankcase ventilating system.

The specific structural arrangement outlined in Figure 6 of the drawings facilitates use of a general reservoir for a fluid medium of an individual system, a power steering means, with a by-pass of a portion of the fluid medium returned from this individual system to an auxiliary reservoir within the general reservoir serving as a source of the same fluid medium for lubricating purposes in a device, an air compressor, for example, separate from the individual system or power steering means. The utilization of the auxiliary reservoir in the main reservoir from which fluid medium is taken for lubricating purposes provides assurance against oversupply and flooding of fluid medium in the device being lubricated when the device itself is not operating. The specific provision of the end member 216 with passages therein permits placement of a dual pump for pressure lubrication purposes and for scavenging purposes on one side of the end member and placement of a power steering pump on the other side of the member 216. Also the member 216 serves as a journaling support for one end of the compressor crankshaft while also closing off one side of the compressor housing 214.

Thus a compact structural arrangement is provided for a combined vehicle power steering and air compressor lubrication system using a minimum number of parts for vehicles which are equipped with both power steering means and another device requiring lubrication for which a fluid medium used in the power steering means operation can also be utilized for lubrication of the device or air compressor provided with the air suspension means on the vehicle. This application is a companion case to our copending application Serial No. 685,463 filed September 23, 1957, which companion application discloses and claims the power steering and lubrication system arrangement of the apparatus disclosed herein.

While the embodiments of the present invention as herein disclosed constitute a preferred form, it is to be understood that other forms might be adopted.

What is claimed is as follows:

1. For use on a vehicle having both a power steering system and an air suspension system including an hydraulic pump for supply of oil under pressure to the power steering system and an air compressor for supply of air under pressure to the air suspension system, an air compressor and power steering pump and reservoir assembly comprising in combination, compressor housing means including cylinder means having piston means therein, closure wall means closing one side of said housing and having crankshaft bearing means therein, a compressor crankshaft journaled in said housing drivingly connected with said piston means and having a journal portion supported in said bearing means and projecting through said closure wall, power steering pump means having a body mounted on the outboard side of said closure wall with the pump means thereof having driven connection with the projecting end of said crankshaft means, a power steering oil reservoir having main and auxiliary portions secured on top of said power steering pump means body, said pump means body forming passage means for passage of power steering fluid medium from said main portion to said power steering pump means, compressor lubricating pump means and scavenging pump means carried by said closure wall inside said compressor housing and having driven connection with said one juornal portion, passage means in said closure wall connecting said compressor lubricating pump means with said bearing means, and means forming passages in said wall and in said pump body connecting the auxiliary portion of said reservoir with said lubricating pump means and with said scavenge pump means for use of the power steering fluid medium in lubrication of said crankshaft journal portions.

2. Apparatus in accordance with claim 1 which includes additional passage means in the said closure wall connecting the pressure discharge side of the said lubricating pump means with the inlet side thereof and including pressure relief valve means in the said last-mentioned passage means.

3. Apparatus in accordance with claim 1 in which the passage means that connects the auxiliary reservoir portion with the scavenge pump comprises passage means in the said closure wall forming inlet passage means for said scavenge pump connecting the same with the interior of the said housing means, and additional passage means in the said closure wall cooperating with passage means in said pump body connected with said auxiliary portion of said reservoir forming discharge passage means for said scavenge pump to deliver fluid to said auxiliary portion of the reservoir.

4. Apparatus in accordance with claim 1 in which the passage means connecting the auxiliary portion of the reservoir with said lubricating pump means comprises passage means in the said pump body connected with said auxiliary reservoir portion cooperating with passage means in the said closure wall forming inlet passage means for said lubricating pump means for supply of power steering fluid from said auxiliary reservoir portion to said lubricating pump means.

5. Apparatus in accordance with claim 1 in which the passage means connecting the auxiliary portion of the reservoir with said lubricating pump means comprises passage means in the said pump body connected with said auxiliary reservoir portion cooperating with passage means in the said closure wall forming inlet passage means for said lubricating pump means for supply of power steering fluid from said auxiliary reservoir portion to said lubricating pump means, and additional passage means in said closure wall connecting a pressure discharge passage from said lubricating pump with the aforesaid inlet passage means and including pressure relief valve means therein normally closing the communication between the said passages but opening in response to a predetermined pressure on the pressure side of said pump to relieve the said pressure into the inlet side of the lubricating pump.

6. Apparatus in accordance with claim 1 in which the end of the crankshaft opposite to the said end projecting through said closure wall also projects beyond the said housing and has an axial passage therein extending from exteriorly of the housing to interiorly thereof which joins with a radial passage therein interiorly of said housing to connect the exterior of the housing with atmosphere and forming thereby a breather passage for said housing, said radial passage providing for centrifuging of lubricant medium out of the breather passage to prevent discharge of lubricant through the breather passage.

7. Apparatus in accordance with claim 1 in which the said one journal portion of said crankshaft includes a shaft portion extending axially beyond the said journal portion into said pump body through seal chamber means in said pump means body immediately adjacent the juncture of the said one journal portion and the shaft portion projecting through said closure wall, and including a shaft seal member in said seal chamber engaging said projecting shaft portion to prevent direct interchange of fluid medium between the compressor and the power steering pump means.

8. A system combining a hydraulic power steering means with a means other than the power steering means and having a separate device requiring lubrication, comprising, a power steering reservoir having a main portion serving as a source of fluid medium for operation of the power steering means and a separate auxiliary portion serving as a source of the same fluid medium for lubrication of the separate device, a power steering pump connected by passages to supply fluid medium under pressure from said main portion to the power steering means and to return a portion of the fluid medium to said main portion of said power steering reservoir and the remainder through a resistance bypass passage to said auxiliary portion, and pumping means connected with said auxiliary portion only for supply of fluid medium under pressure to lubricate the separate device and for scavenging the fluid medium from said separate device back to said auxiliary reservoir portion.

9. A system combining a hydraulic power steering means with a means other than the power steering means and having a separate device requiring lubrication, comprising a power steering reservoir having a main portion serving as a source of fluid medium for operation of the power steering means and a separate auxiliary portion serving as a source of the same fluid medium for lubrication of the separate device, a power steering pump connected to supply fluid medium under pressure from said main portion to the power steering means and to return a portion of the fluid medium through a return conduit to said main portion of said power steering reservoir and the remainder through a resistance bypass passage from the return conduit to said auxiliary portion, a primary pumping means connected with said auxiliary portion for supply of fluid medium under pressure to lubricate the separate device, a blow-off return means for channeling of excess pressure fluid medium directly from output to said auxiliary portion and to inlet of said primary pumping means, and a secondary pumping means connected with said auxiliary portion to scavenge fluid medium from the separate device to return the fluid medium to said auxiliary portion of said power steering reservoir.

10. For a vehicle having a sprung mass supported on an unsprung mass and equipped with both a power steering means and a pneumatic suspension means including an air compressor, a combined system for vehicle power steering operation and for air compressor lubrication, comprising, a power steering means including a control valve for regulating flow of a power steering fluid medium to and from an actuating component connected to assist steering gear operation, a pneumatic suspension means including air springs provided to support the sprung mass on the unsprung mass, control valves for the air springs having air inlet and exhaust passages opened and closed in response to change of clearance height to other than a predetermined distance between the sprung and unsprung masses, a means for storage of air under pressure to be supplied under control of said valves to said air springs to maintain a predetermined clearance height, a vehicle engine-driven air compressor for supply of air under pressure to said storage means and having a crankshaft with air compressor piston and crankshaft journalling portions requiring lubrication, a dual pumping means connected with the crankshaft driving a pressure lubrication pumping portion of said dual pumping means to supply power steering fluid medium to the journalling portions and a scavenge pumping portion of said dual pumping means for removing said power steering fluid medium from said compressor, a power steering pumping means also driven by the compressor crankshaft and connected with said power steering control valve to circulate power steering fluid medium thereto under pressure, and a power steering fluid reservoir having a main reservoir portion providing a supply of power steering fluid medium for the power steering pump means and a separate auxiliary reservoir portion providing a supply of power steering fluid medium for the lubricating pumping portion of said dual pumping means, said power steering pumping means being connected with said main reservoir portion for supply of fluid therefrom to said steering control valve and return fluid from said steering control valve to said main reservoir portion and to said auxiliary reservoir portion, said lubrication pumping portion of said dual pumping means receiving fluid from said auxiliary reservoir portion and said scavenge pumping portion of the dual pumping means returning the fluid medium under pressure from said compressor to said auxiliary portion of said power steering reservoir.

11. Apparatus constructed and arranged in accordance with claim 10 that includes restrictive passage forming means for returning a portion of the power steering fluid medium used in the power steering means to said auxiliary reservoir portion.

References Cited in the file of this patent

UNITED STATES PATENTS

| | | |
|---|---|---|
| 1,647,009 | Lovejoy | Oct. 25, 1927 |
| 1,840,045 | McCormack | Jan. 5, 1932 |
| 2,113,691 | Heller | Apr. 12, 1938 |
| 2,128,388 | Williams | Aug. 30, 1938 |
| 2,235,962 | Hornady | Mar. 25, 1941 |
| 2,300,973 | Rogers | Nov. 3, 1942 |
| 2,322,874 | Neeson | June 29, 1943 |
| 2,638,264 | Browne | May 12, 1953 |
| 2,638,265 | Newton | May 12, 1953 |
| 2,802,674 | Jackson | Aug. 13, 1957 |